(12) United States Patent
Muller

(10) Patent No.: US 6,168,213 B1
(45) Date of Patent: Jan. 2, 2001

(54) CONNECTOR AND CONNECTION METHOD

(75) Inventor: Laurent E. Muller, Stafford, TX (US)

(73) Assignee: Schlumberger Technology Corporation, Sugar Land, TX (US)

( * ) Notice: Under 35 U.S.C. 154(b), the term of this patent shall be extended for 0 days.

(21) Appl. No.: 08/884,056

(22) Filed: Jun. 27, 1997

(51) Int. Cl.$^7$ ..................................................... F16L 37/10
(52) U.S. Cl. ........................ 285/391; 285/330; 285/913; 166/242.6; 403/364
(58) Field of Search ................................. 285/332.4, 330, 285/391, 333, 394, 396, 913, 920; 166/242.6, 55.1; 403/364, 311, 350

(56) References Cited

U.S. PATENT DOCUMENTS

| | | | |
|---|---|---|---|
| 4,456,081 | * | 6/1984 | Newman ........................... 277/336 X |
| 5,452,923 | * | 9/1995 | Smith ................................ 285/330 X |
| 5,529,127 | * | 6/1996 | Burleson et al. .................... 166/55.1 |

OTHER PUBLICATIONS

"The Perforating and Testing Review", Schlumberger Wireline & Testing, vol. 8, No. 1 pp. 2–10, May 1995.*
Shigley, J. E. et al, Mechanical Engineering Design, McGraw–Hill, New York, p. 469, 1983.*
Ringfeder® Friction Springs in Mechanical Engineering, Catalogue R 601, Oct. 1995.

* cited by examiner

Primary Examiner—Lynne A. Reichard
Assistant Examiner—Greg Binda
(74) Attorney, Agent, or Firm—Rosenthal & Usha L.L.P.

(57) ABSTRACT

A connector having a stinger and a receiver. The receiver is cocked by applying counter-acting torques to separate sections of the receiver. The counteracting torques compress a spring member. In the cocked position, the stinger is inserted into the receiver. When the counter-acting torques are released, the spring decompresses and locks the stinger in the receiver.

21 Claims, 9 Drawing Sheets

CONNECTOR AND CONNECTION METHOD

BACKGROUND OF THE INVENTION

This invention relates generally to a mechanism and method for securely and quickly connecting two members. One application for such connectors is with the Completion Insertion and Retrieval under Pressure system, herein referred to as CIRP system currently offered by Schlumberger Perforating and Testing. The Schlumberger CIRP system is used to insert tools in a pressurized wellbore. The connector used in the existing CIRP system uses a conventional spiral wound wire spring to maintain the connector in its locked position.

SUMMARY OF THE INVENTION

In some applications, it may be desirable to increase the torque available to keep a connector in its locked position. Increased torque may be advantageous in a CIRP system because the connector may be subject to extreme forces. Also, as the connector diameter decreases, the engagement torque available from a conventional spiral wound wire spring decreases significantly because the usable spring size is reduced.

One embodiment of the present invention provides a significant increase in the torque available to secure a connector in a locked position as compared to the torque available from a similarly sized conventional spiral wound wire spring. Because one embodiment of the present invention provides increased torque density, smaller connectors are possible that have sufficient engagement torque to remain in their locked position in abusive environments.

Another embodiment is a connector having a receiver. The receiver has a receiver gripping surface at a first end and a fork at a second end. A stinger has a stinger fork that is concentric with and adjacent the receiver fork. A sleeve has a first end adjacent the receiver fork and a sleeve gripping surface at its second end. The sleeve is rotationally engageable with the receiver fork. A first cam is connected to the sleeve remote from the sleeve gripping surface. The first cam is concentric with and adjacent the receiver. A cam engagement member is adjacent the first cam. The cam engagement member slidingly engages the first cam. The cam engagement member is also adjacent the receiver and is rotationally restrained relative to the receiver. A compressive member support is connected to the receiver. Interposed between the compressive member support and the first cam is a compressive member.

In an alternative embodiment of the invention, the above-described first cam has a helical surface that is inclined approximately 20 to 30 degrees from a plane perpendicular to the axis of the receiver.

In another alternative embodiment, the above-described stinger fork has stinger fork teeth on its exterior surface, and the above-described receiver has receiver fork teeth on its exterior surface. The stinger fork teeth and receiver fork teeth slidingly engage sleeve teeth on the interior surface of the above-described sleeve.

In yet another alternative embodiment, a protective member is connected to the receiver and circumscribes the above-described first cam, cam engagement member, and compressive member.

In another embodiment of the invention, a connector has a receiver. The receiver has a gripping surface at its first end and a receiver fork at the second end. A stinger has a stinger fork adjacent the receiver fork. A sleeve has a first end adjacent the receiver fork and a sleeve gripping surface at a second end. The sleeve is rotationally engageable with the receiver fork and the stinger fork. A first cam is connected to the sleeve remote from the sleeve gripping surface. The first cam is concentric with and adjacent the receiver. Also, the first cam is axially restrained relative to the receiver. A second cam is adjacent the first cam. The second cam slidingly engages the first cam. The second cam is concentric with and adjacent the receiver, and the second cam is rotationally restrained relative to the receiver. A spring ring support is connected to the receiver. A spring ring is interposed between the second cam and the spring ring support.

In another embodiment, a connector has a receiver. The receiver has a plurality of pinion teeth at a first end and a plurality of forks at a second end. A stinger has a plurality of stinger forks that are adjacent the receiver forks. A locking sleeve has a first end adjacent the receiver forks. The locking sleeve has a plurality of pinion teeth at a second end. The locking sleeve is rotationally engageable with receiver forks and stinger forks. The locking sleeve is connected to a first cam remote from the locking sleeve pinion teeth. The first cam is concentric with and adjacent the receiver, and the first cam is axially restrained relative to the receiver. A second cam is adjacent the first cam. The second cam slidingly engages the first cam. The second cam is concentric with and adjacent the receiver, and is rotationally restrained relative to the receiver. A spring ring support is connected to the receiver, and a plurality of spring rings are interposed between the second cam and the spring ring support.

Another embodiment of the present invention involves a method of connecting two members. A first section of the receiving member is secured. A second section of the receiving member is rotated relative to the first section from an uncocked position to a cocked position. The rotation of the receiving member axially compresses a compressive member. A stinger member is inserted into the receiving member and the receiving member is then returned to its uncocked position, which axially decompresses the compressive member. The return of the second receiving member section to its uncocked position locks the stinger member in engagement with the receiving member.

The scope and applicability of the present invention will be apparent from the claims following the detailed description. It should be understood that the detailed description and examples given represent embodiments of the present invention and are given by way of illustration only. Various changes and modifications within the spirit and scope of the invention will be obvious.

DESCRIPTION OF THE PREFERRED EMBODIMENTS

Figure 1:
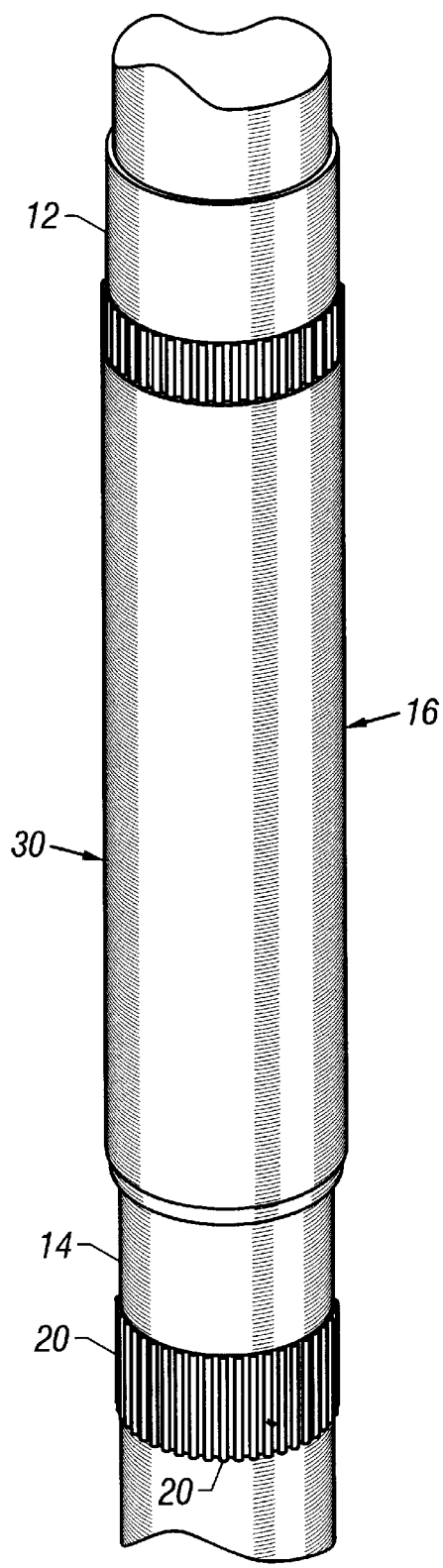
FIG. 1 is a perspective view of one embodiment of the present invention.

FIG. 1 depicts one embodiment of the present invention. A stinger 12 is inserted into a receiver 14 to form a connector 16.

Figure 2:
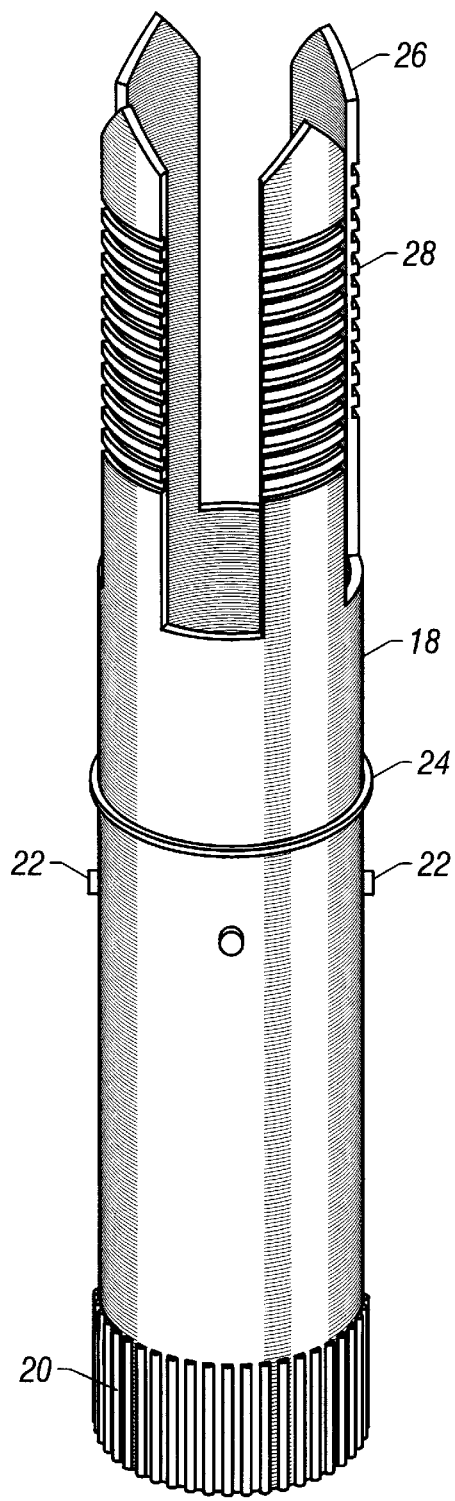
FIG. 2 is a perspective view of a feature of an embodiment of the present invention.

FIG. 2 depicts a receiver body 18. At one end of the receiver body 18 are a plurality of receiver body pinion teeth 20. A plurality of pins 22 protrude from the receiver body 18 and a snap ring 24 is positioned in a groove in the receiver body 18 (the groove is not shown). In this embodiment, four receiving forks 26 are formed in the receiver body 18 opposite the receiver body pinion teeth 20. In other embodiments, different numbers of receiver forks may be used. For example, one embodiment has six receiver forks. A plurality of receiver fork teeth 28 are formed in the exterior surface of each receiver fork. The receiver forks 26 are spaced around the circumference of the receiver body 18, preferably such that a receiver fork is diametrically opposite another receiver fork.

Figure 3:
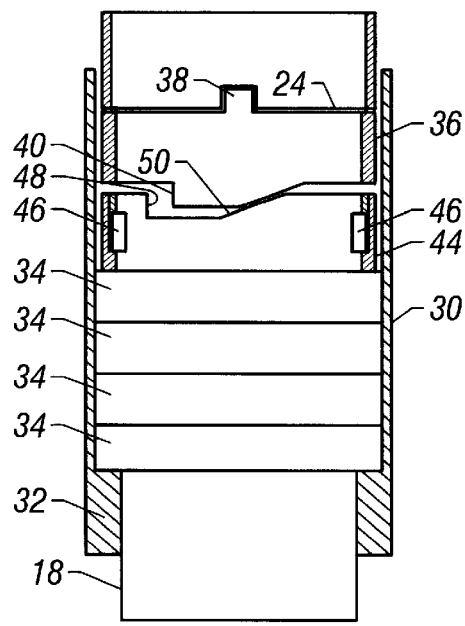
FIG. 3 is an elevation view of certain aspects of an embodiment of the present invention.

FIG. 3 depicts a section of the receiver body 18. A protective shell 30 is connected to the receiver body 18. In this embodiment the protective shell 30 is connected to the receiver body 18 through a spring ring support 32. In one embodiment, the protective shell 30 has an exterior diameter greater than the receiver body pinion teeth 20 and covers the receiver 14 up to the receiver body pinion teeth 20. The spring ring support 32 is adjacent a spring ring 34 and prevents axial movement of the adjacent spring ring 34 relative to the receiver body 18. A plurality of spring rings 34 are concentric with the receiver body 18 and are interposed between the receiver body 18 and the protective shell 30.

A first cam 36 is adjacent the snap ring 24. The snap ring 24 prevents axial movement of the first cam 36 relative to the receiver body 18. The first cam 36 is concentric with the receiver body 18 and is free to rotate relative to the receiver body 18. The first cam 36 has a plurality of first cam tongues 38 that extend towards the receiver forks 26 and are interposed between the snap ring 24 and the protective shell 30. Opposite the first cam tongues 38 are a plurality of first cam stops 40 and a plurality of first cam helical surfaces 42.

A second cam 44 is interposed between the first cam 36 and the plurality of spring rings 34. The second cam 44 is shown in cross-section in FIG. 3. The second cam 44 has a plurality of grooves 46 that slidingly engage the pins 22 protruding from the receiver body 18. The pins 22 and second cam grooves 46 engage to prevent rotational movement of the second cam 44 relative to the receiver body 18, while permitting axial movement of the second cam 44 relative to the receiver body 18. The second cam 44 has a plurality of second cam stops 48 and a plurality of second cam helical surfaces 50.

The second cam helical surfaces 50 slidingly engage the first cam helical surfaces 42 and, upon counter-clockwise rotation of the first cam 36, the second cam 44 compresses the plurality of spring rings 34. In one embodiment, the cam helical surfaces 42, 50 are inclined 20 to 30 degrees from a plane perpendicular to the receiver body 18 axis. The cam stops 40, 48 prevent clockwise rotation of the first cam 36 relative to the second cam 44 past a predetermined rest point. In one embodiment, the spring rings 34 may carry a compressive load when the first cam stop 40 is adjacent the second cam stop 48.

In an alternative embodiment, the spring rings 34 are supported by a shoulder threadingly connected to the receiver body 18 and the first cam 36 abuts against a shoulder formed in the receiver body 18.

Figure 4:
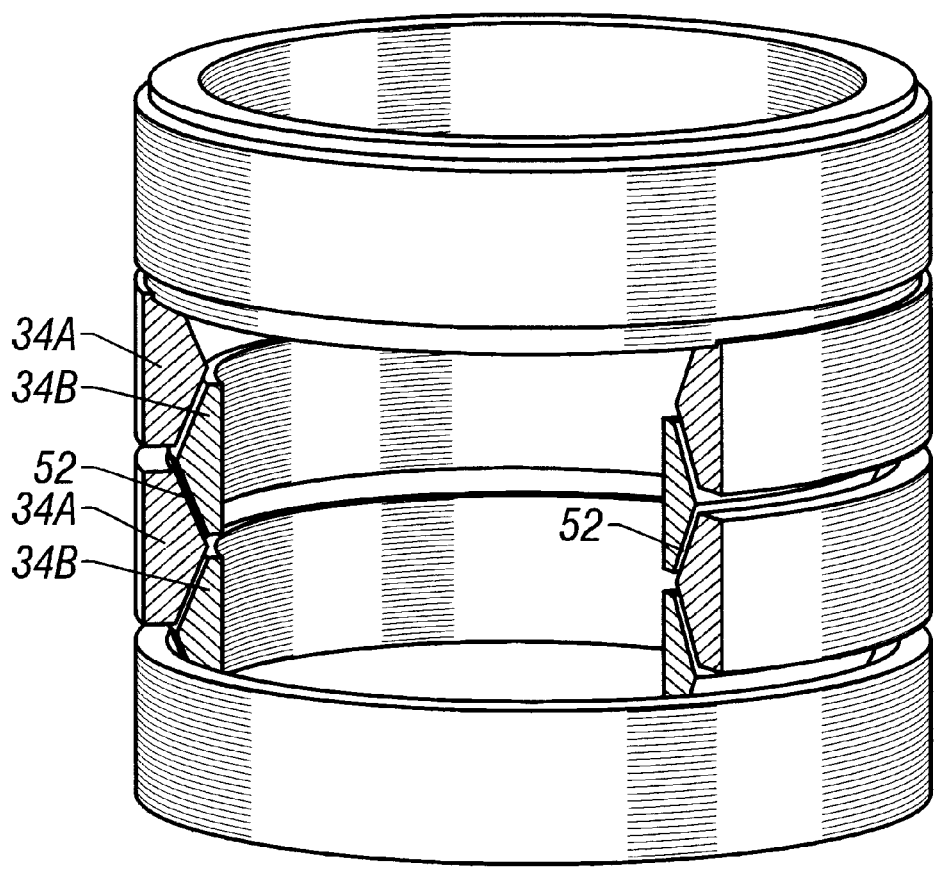
FIG. 4 is a cut-a-way perspective view of an aspect of an embodiment of the present invention.

FIG. 4 depicts a partial cut-a-way of spring rings 34. The spring rings 34 are commercially available from Ringfeder Corp. of Westwood, N.J. in a variety of sizes and configurations. The spring rings 34 are a plurality of stackable external and internal rings 34a, 34b. When stacked, the rings engage at alternating conical surfaces 52. Upon compression of the stack, the external spring rings 34a are subject to an expanding force and the internal spring rings 34b are subject to a compressive force. In one embodiment, the spring rings 34 are made of beryllium copper or bronze. In an another embodiment, the spring rings 34 are protected by a sleeve.

Figure 5:
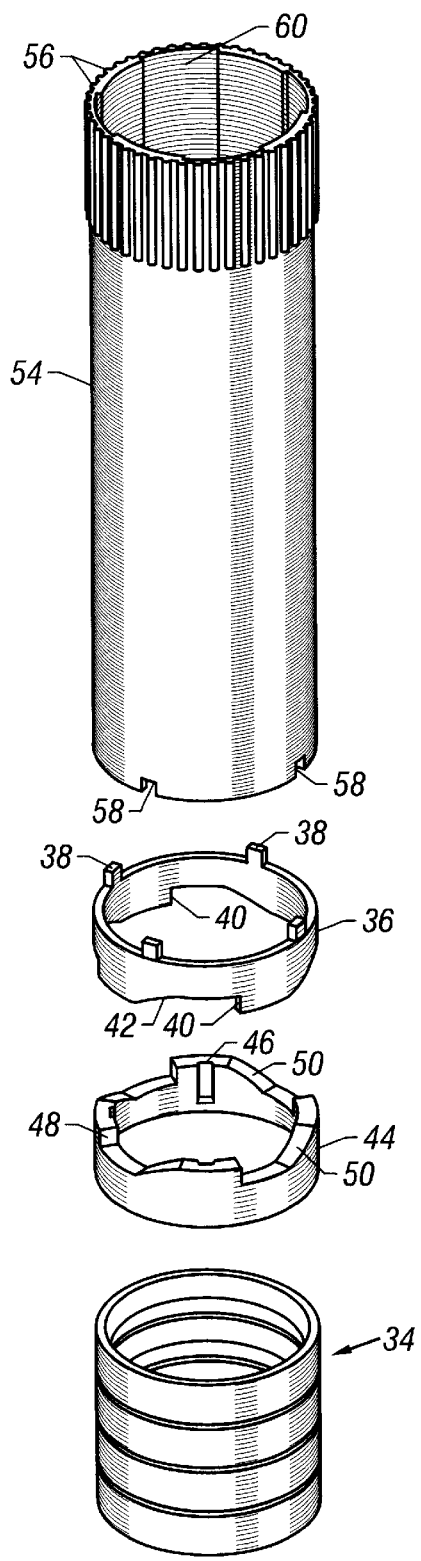
FIG. 5 is an exploded perspective view of features of one embodiment of the present invention.
Figure 6A:
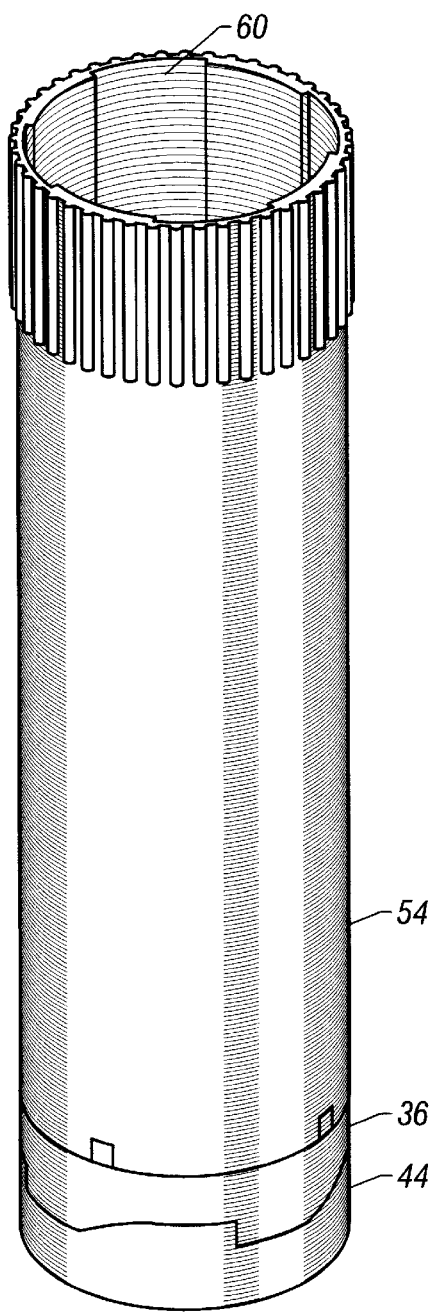
FIG. 6a is a perspective view of features of one embodiment of the present invention.
Figure 6B:
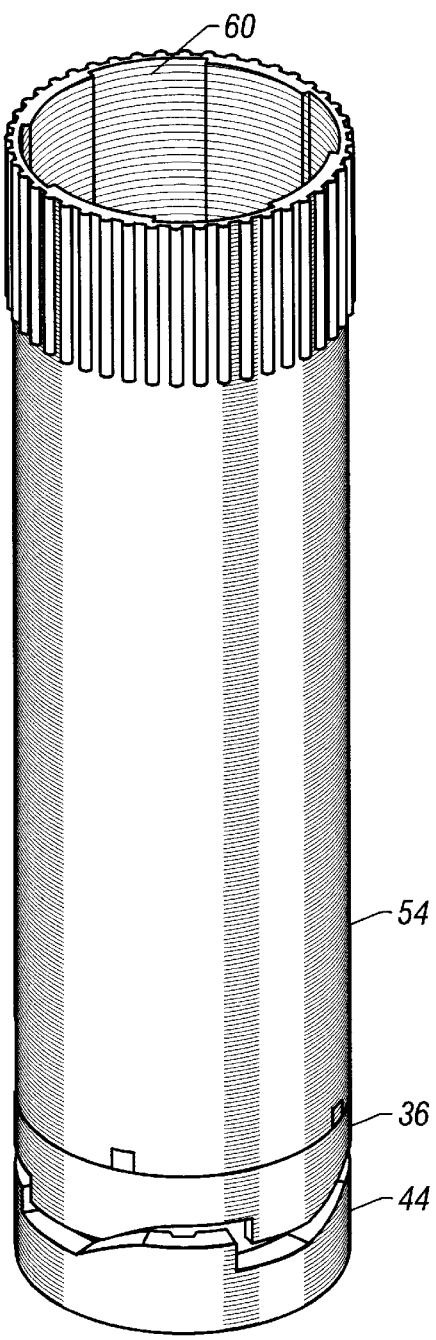
FIG. 6b is a perspective view of features of one embodiment of the present invention.

FIG. 5 is an exploded view of the spring rings 34, first and second cams 36, 44, and the locking sleeve 54. Locking sleeve pinion teeth 56 are at one end of the locking sleeve 54 and a plurality of locking sleeve grooves 58 are at the opposite end. The locking sleeve grooves 58 engage the first cam member tongues 38 as depicted in FIG. 6a. When the locking sleeve 54 and the first cam 36 are rotated counter-clockwise relative to the second cam 44, the first and second cams 36, 44 are forced apart as depicted in 6b. The first cam 36 and the spring ring support 32 are restrained axially. Counter-clockwise rotation of the first cam 36 axially compresses the spring rings 34 between the second cam 44 and the spring ring support 32.

Figure 7:
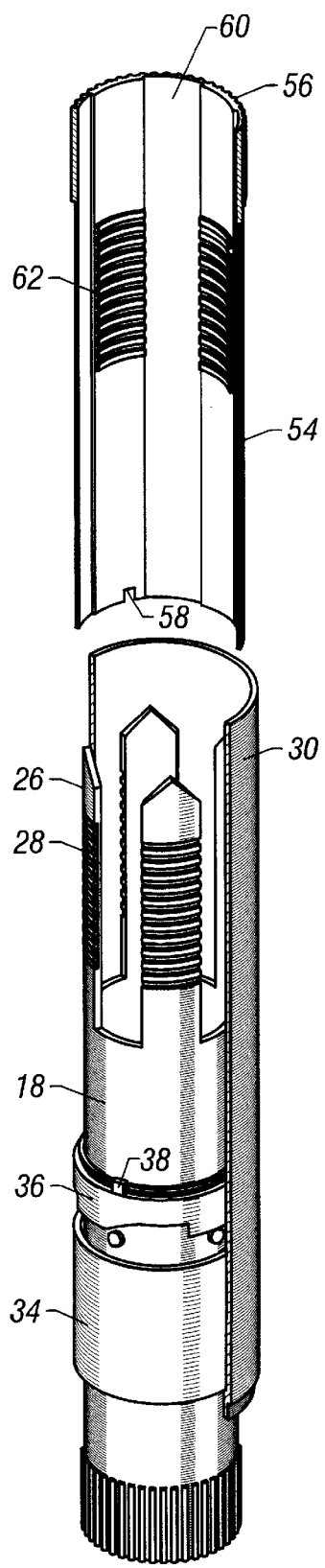
FIG. 7 is a cut-a-way exploded perspective view of aspects of one embodiment of the present invention.

As shown in FIG. 7, the locking sleeve 54 has a plurality of longitudinal locking sleeve slots 60 in its interior surface. The locking sleeve 54 is interposed between the protective shell 30 and the receiver forks 26. In one embodiment, a plurality of locking sleeve teeth 62 are on the locking sleeve 54 interior surface between the locking sleeve slots 60, and engage the receiver fork teeth 28.

Figure 8:
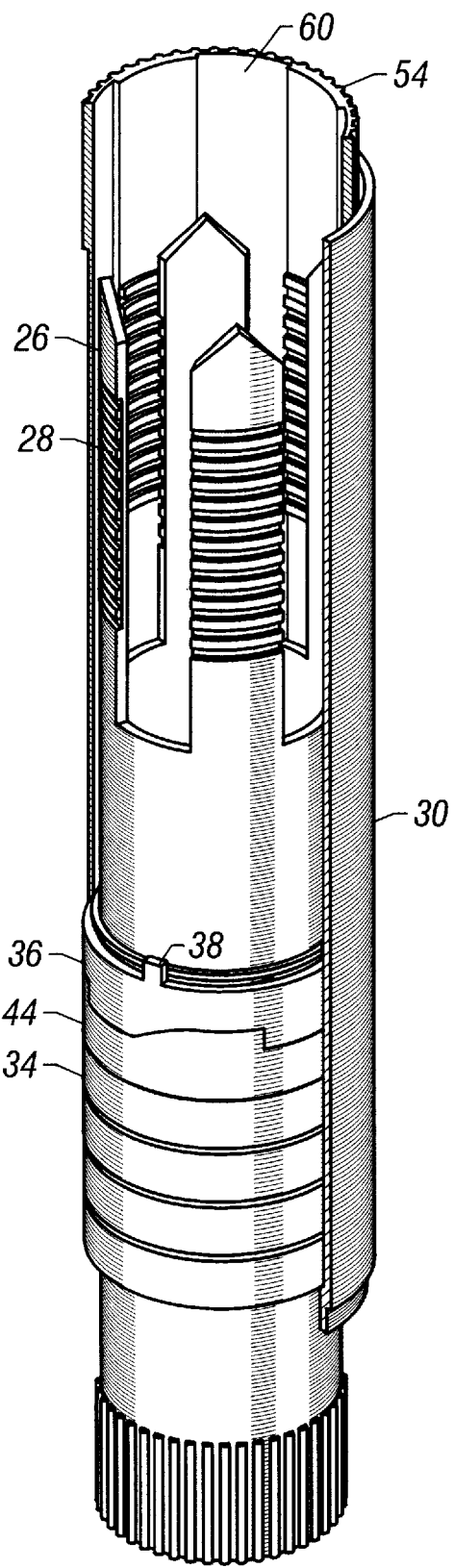
FIG. 8 is a cut-a-way perspective view of aspects of one embodiment of the present invention.

In FIG. 8, the assembled receiver 14 is uncocked. The locking sleeve slots 60 are partially aligned with the receiver forks 26 and are partially aligned with the space between the receiver forks. The receiver fork teeth 28 engage a portion of the locking sleeve teeth 62. The remainder of each of the receiver fork teeth 28 extends into the locking sleeve slot 60. In the uncocked position the first cam stop 40 rests against the second cam stop 48. The portion of the locking sleeve teeth 62 not engaging the receiver fork teeth 28 extends into the space between adjacent receiver forks.

Figure 9:
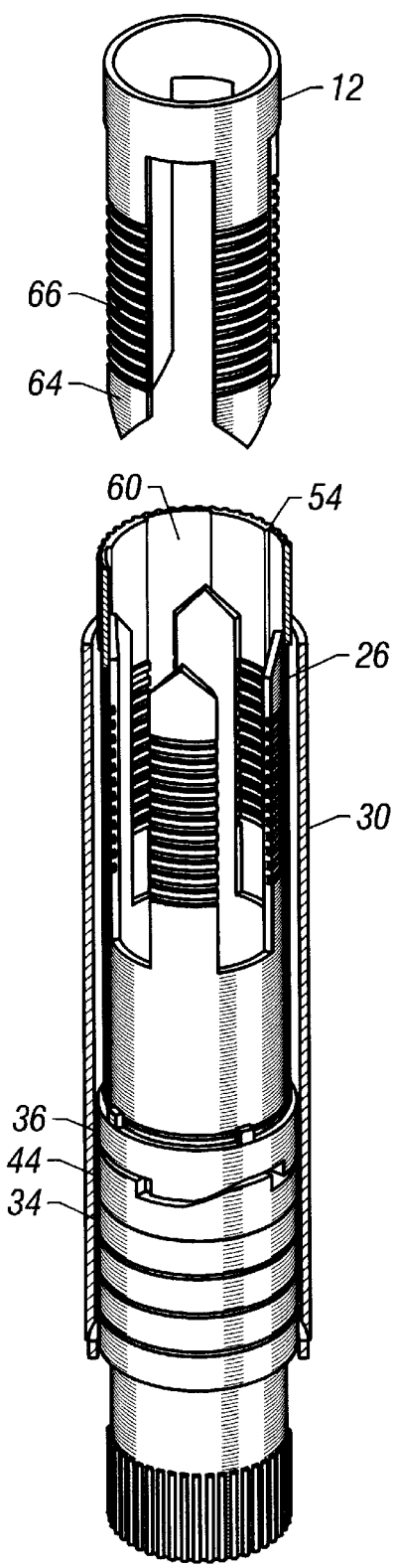
FIG. 9 is an exploded cut-a-way perspective view of aspects of an embodiment of the present invention.

The assembled receiver 14 in FIG. 9 is in its cocked position. Rotation of the first cam 36 relative to the second cam 44 has forced the cams 36, 44 apart. The spring rings 34 are axially compressed. The spring rings 34 may only be axially compressed a predetermined distance. Once fully compressed, the exterior spring rings 34a abut adjacent exterior spring rings 34a, and interior spring rings 34b abut adjacent interior spring rings 34b. The full axial compression of the spring rings 34 creates a positive stop, preventing counter-clockwise rotation of the locking sleeve 54 past the cocked position.

In an alternative embodiment, a key and slot connection between the first cam 36 and the receiver body 18 (not shown) prevents counter-clockwise rotation of the locking sleeve 54 past the cocked position.

In the cocked position, the locking sleeve slots 60 are aligned with the gaps between the receiver forks 26, and the locking sleeve teeth 62 fully engage the receiver fork teeth 28. The receiver 14 is cocked by rotating the locking sleeve 54 counter-clockwise relative to the receiver body 18. This is accomplished by applying counteracting torques to the receiver body pinion teeth 20 and the locking sleeve pinion teeth 56.

When the assembled receiver 14 is in the cocked position, the stinger 12 may be inserted into the receiver 14. The stinger forks 64 are inserted into the locking sleeve slots 60 and the space between adjacent receiver forks 26. The stinger forks 64 are approximately as wide as the locking sleeve slots 60 and the space between adjacent receiver forks 26. Once inserted, the stinger forks 64 abut adjacent receiver forks 26. Stinger fork teeth 66 are on the stinger fork 64 exterior surfaces and are aligned with the receiver fork teeth 28.

Figure 10:
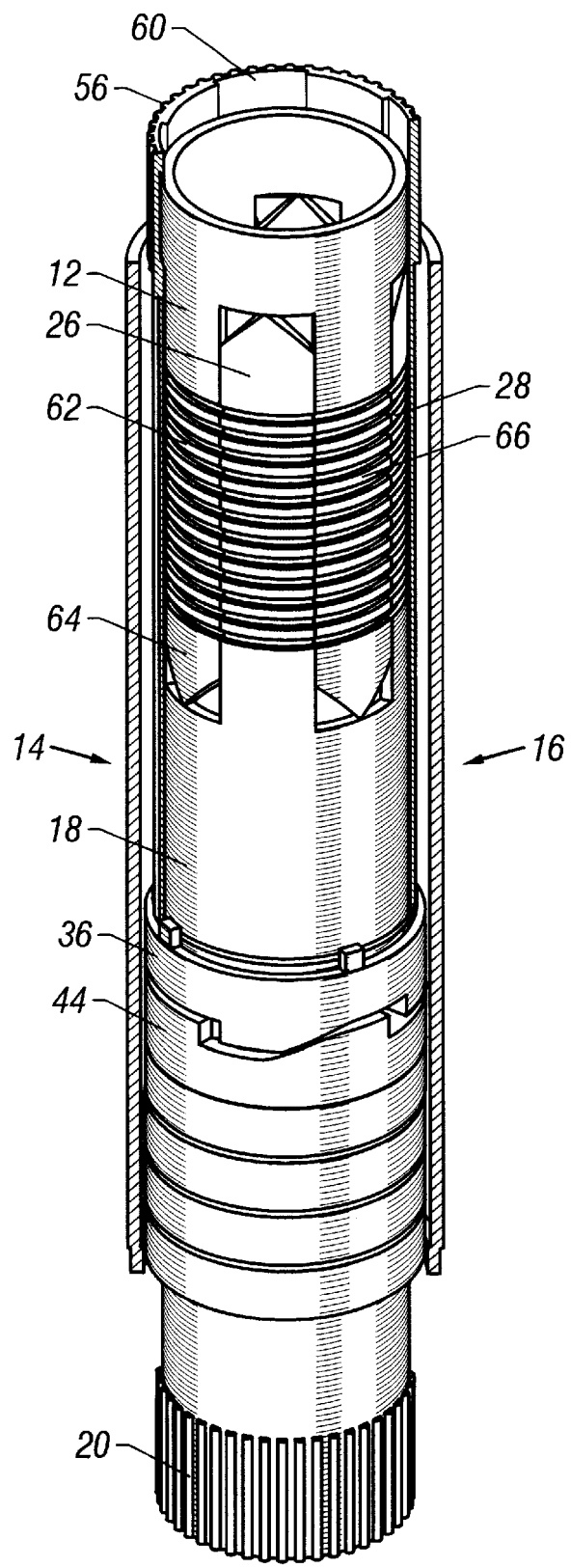
FIG. 10 is a cut-a-way perspective view of an embodiment of the present invention.

FIG. 10 is a cut away view of an assembled connector showing the stinger forks 64 adjacent the receiver forks 26.

Once the stinger forks 64 are inserted into the locking sleeve slots 60, the torque applied to the locking sleeve pinion teeth 56 and the receiver body pinion teeth 20 can be released. Upon release of the applied torque, the spring rings 34 axially decompress and force the first cam 36 to rotate clockwise relative to the receiver body 18. Clockwise rotation of the first cam 36 rotates the connected locking sleeve 54 clockwise as well. As the locking sleeve 54 rotates, the locking sleeve teeth 62 engage the stinger fork teeth 66. In the uncocked position, the locking sleeve teeth 66 engage a portion of the receiver fork teeth 28 and a portion of the stinger fork teeth 66.

The embodiments described may be varied in many obvious ways. Such variations are not to be regarded as a departure from the spirit or scope of the invention. All such modifications are intended to be included within the scope of the following claims.

What is claimed is:

1. A connector comprising:
   a receiver having a gripping surface at a first end and a receiver fork at a second end;
   a stinger having a stinger fork disposed adjacent said receiver fork;
   a sleeve having a first end disposed adjacent said receiver fork and a sleeve gripping surface at a second end, said sleeve being rotationally engageable with said receiver fork and said stinger fork;
   a first cam connected to said sleeve remote from said sleeve gripping surface, said first cam being concentric with and adjacent to said receiver;
   a cam engagement member disposed adjacent to and slidingly engaging said first cam, said cam engagement member being adjacent to and rotationally restrained relative to said receiver, wherein relative movement between said first cam and said cam engagement member in a first direction engages said sleeve with said receiver fork and relative movement between said first cam and said cam engagement member in a second direction engages said sleeve with said stinger fork;
   a compressive member support connected to said receiver; and
   a compressive member interposed between said compressive member support and said first cam, said compressive member being arranged to limit relative movement between said first cam and cam engagement member.

2. The connector of claim 1 wherein:
said first cam has a helical surface, said helical surface being inclined approximately 20 to 30 degrees from a plane perpendicular to the axis of said receiver.

3. The connector of claim 1 wherein:
said cam engagement member is a second cam.

4. The connector of claim 1 wherein:
said compressive member is a spring ring.

5. The connector of claim 4 wherein:
said spring ring is a beryllium copper alloy.

6. The connector of claim 4 wherein:
said spring ring is a bronze.

7. The connector of claim 1 additionally comprising:
stinger fork teeth,
    said stinger fork teeth being on the exterior surface of said stinger fork;
receiver fork teeth,
    said receiver fork teeth being located on the exterior surface of said receiver fork said stinger fork teeth and said receiver fork teeth being concentric and equidistant from the axis of said receiver; and
sleeve teeth,
    said sleeve teeth being located on the interior surface of said sleeve, said sleeve teeth being in sliding engagement with said receiver teeth and said stinger teeth.

8. The connector of claim 1 additionally comprising:
a first cam stop,
    said first cam stop preventing rotation of said first cam beyond a first predetermined point relative to said receiver.

9. The connector of claim 1 wherein:
said receiver gripping surface is a plurality of pinion teeth.

10. A connector comprising:
    a receiver having a gripping surface at a first end and a receiver fork at a second end;
    a stinger having a stinger fork disposed adjacent said receiver fork;
    a sleeve having a first end adjacent said receiver fork and a sleeve gripping surface at a second end, said sleeve being rotationally engageable with said receiver fork and said stinger fork;
    a first cam connected to said sleeve remote from said sleeve gripping surface, said first cam being concentric with and adjacent to said receiver;
    a cam engagement member disposed adjacent to and slidingly engaging said first cam, said cam engagement member being adjacent to and rotationally restrained relative to said receiver;
    a compressive member support connected to said receiver;
    a compressive member interposed between said compressive member support and said first cam; and
    a protective member connected to said receiver, said protective member circumscribing said first cam, said cam engagement member, and said compressive member.

11. A connector comprising:
    a receiver having a receiver gripping surface at a first end and a receiver fork at a second end;
    a stinger having a stinger fork disposed adjacent said receiver fork;
    a sleeve having a first end adjacent said receiver fork and a sleeve gripping surface at a second end, said sleeve being rotationally engageable with the receiver fork and said stinger fork;

a first cam connected to said sleeve remote from said sleeve gripping surface, said first cam being concentric with and adjacent to said receiver and axially restrained relative to said receiver;

a second cam disposed adjacent to and slidingly engaging said first cam, said second cam being concentric with and adjacent to and rotationally restrained relative to said receiver, wherein relative movement between said first cam and said second cam in a first direction engages said sleeve with said receiver fork and relative movement between said first cam and said second cam in a second direction engages said sleeve with said stinger fork;

a spring ring support connected to said receiver; and a spring ring interposed between said second cam and said spring ring support, said spring ring being arranged to limit relative movement between said first cam and said second cam.

12. The connector of claim 11 wherein:

said first cam
slidingly engages said second cam along a helical surface, said helical surface being inclined approximately 20 to 30 degrees from a plane perpendicular to the axis of the receiver.

13. The connector of claim 11 wherein:

said spring ring is a beryllium copper alloy.

14. The connector of claim 11 wherein:

said spring ring is bronze.

15. The connector of claim 11 additionally comprising:

receiver fork teeth,
said receiver fork teeth being located on the exterior surface of said receiver fork; and stinger fork teeth,
said stinger fork teeth being located on the exterior surface of said stinger fork, said stinger fork teeth being slidingly engaged with said receiver teeth.

16. The connector of claim 11 additionally comprising:

receiver fork teeth,
said receiver fork teeth being located on the exterior surface of said receiver fork;

stinger fork teeth,
said stinger fork teeth being located on the exterior surface of said stinger; and sleeve teeth,
said sleeve teeth located on the interior surface of said sleeve, said sleeve teeth slidingly engaging said receiver and said stinger teeth.

17. A connector comprising:

a receiver having a plurality of pinion teeth at a first end and a plurality of forks at a second end;

a stinger having a plurality of stinger forks disposed adjacent said receiver forks;

a locking sleeve having a first end disposed adjacent said receiver forks and a plurality of pinion teeth at a second end, said locking sleeve being rotationally engageable with said receiver forks and said stinger forks;

a first cam connected to said locking sleeve remote from said locking sleeve pinion teeth, said first cam being concentric with and adjacent to said receiver and axially restrained relative to said receiver;

a second cam disposed adjacent to and slidingly engaging said first cam, said second cam being concentric with and adjacent to said receiver and rotationally restrained relative to said receiver, wherein relative movement between said first cam and said second cam in a first direction engages said sleeve with said receiver fork and relative movement between said first cam and said second cam in a second direction engages said sleeve with said stinger fork;

a spring ring support, said spring ring support being connected to said receiver; and a plurality of spring rings, said plurality of spring rings being interposed between said second cam and said spring ring support, said plurality of spring rings being arranged to limit relative movement between said first cam and said second cam.

18. A connection method comprising:

securing a first section of a receiver;

cocking said receiver by rotating a second section of said receiver about said receiver's axis relative to said first section, said rotation axially compressing a compressive member;

inserting a stinger into said receiver; and uncocking said receiver by returning said second receiver section to its original position relative to said first receiver section which axially decompresses said compressive member, said return of said second receiver section to its original position locking said stinger in engagement with said receiver.

19. The method of claim 18, wherein:

said compressive member is a spring ring.

20. The method of claim 18, wherein:

a cam translates the axially compression and decompression of said compressive member into rotational movement of said second receiver section relative to said first receiver section.

21. The method of claim 18, wherein:

said receiver has a locking sleeve and receiver forks, said stinger has stinger forks, and said locking sleeve slidingly engages said receiver forks and said stinger forks.

* * * * *